Dec. 29, 1959  H. J. ELLSWORTH  2,918,725
STAR CLOCK
Filed Sept. 24, 1958
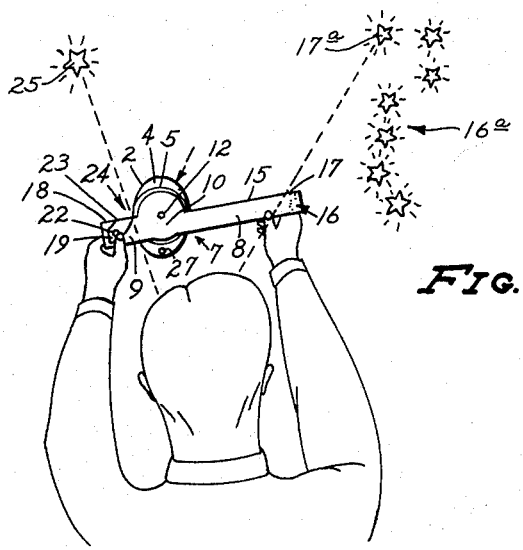
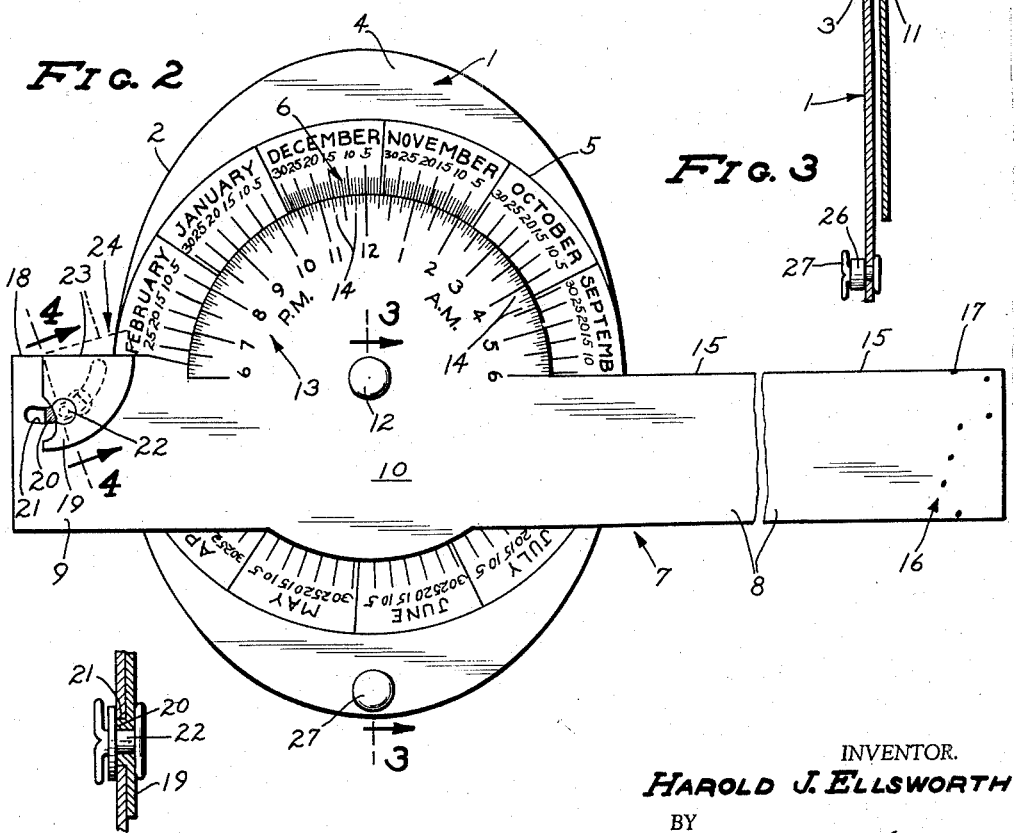
INVENTOR.
HAROLD J. ELLSWORTH
BY
ATTORNEYS United States Patent Office 2,918,725
Patented Dec. 29, 1959

2,918,725

STAR CLOCK

Harold J. Ellsworth, Minneapolis, Minn.

Application September 24, 1958, Serial No. 763,104

7 Claims. (Cl. 33—62)

My invention relates to devices for indicating local time by observation of the relative positions of given stars, such devices being generally known as star clocks.

An important object of my invention is the provision of a star clock which can be used to indicate local time with appreciable accuracy and speed.

Another object of my invention is the provision of a star clock having novel means for compensating for different degrees of terrestrial latitude at which readings may be taken.

A still further object of my invention is the provision of a star clock which, when being used to take a sight or a reading on a given pair of stars, automatically compensates for angularity between the true celestial pole and the sighted star most nearly aligned with said celestial pole.

Still another object of my invention is the provision of a star clock comprising a main body and a sighting bar pivotally secured thereto, the body being weighted at one portion, whereby the same will swing freely about the axis of its pivotal connection with the sighting bar, under action of gravity, to the desired position relative to said sighting bar when the sighting bar is properly disposed in taking a sight or a reading on said given pair of stars.

Another object of my invention is the provision of a star clock as set forth, which will indicate local time directly when a reading is taken on a given standard time meridian, and which requires but a minimum of calculation to arrive at local time at points east or west of said standard time meridian.

Still another object of my invention is the provision of a star clock which automatically compensates for the changes in the angular relationship of the lines of sight between the observer and the reference stars during the apparent movement of said stars about their diurnal circle.

The above, and still further highly important objects and advantages of my invention will become apparent from the following detailed specification, appended claims and attached drawings.

Referring to the drawings, which illustrate the invention, and in which like reference characters indicate like parts throughout the several views:

Fig. 1 is a view partly in elevation and partly diagrammatic, illustrating the manner of taking a sight or a reading with my device for the purpose of determining local time;

Fig. 2 is an enlarged view in front elevation of my device, some parts being broken away;

Fig. 3 is a fragmentary view in section taken on the line 3—3 of Fig. 2; and

Fig. 4 is an enlarged fragmentary detail in section taken substantially on the line 4—4 of Fig. 2.

In the preferred embodiment of my invention illustrated, a flat main body is indicated generally by the numeral 1, the same being made from any suitable flat sheet material, such as stiff cardboard, plastic or metal. The main body 1 defines an ellipse 2, in this case the ellipse 2 comprising the peripheral edge of the main body 1, the center thereof being perforated to receive a hollow grommet or the like 3. The front face 4 of the main body 1 has imprinted thereon a circular calendar dial 5, the same indicating the twelve months of the year and being provided with circumferentially spaced radial lines 6 indicating the days of each month. It will be noted that the circular or annular calendar dial 5 is concentric with the central grommet 3, for a purpose which will hereinafter become apparent.

Overlying the front surface of the main body 1 is an elongated sighting bar 7 which comprises generally aligned relatively long and relatively short arms 8 and 9 respectively, and a generally circular head portion 10 connecting the arms 8 and 9. At its center, the circular head portion 10 is perforated to receive a grommet 11 that is axially aligned with the grommet 3 in the main body 1. A pivot pin or rivet 12 extends through the aligned grommets 3 and 11, and permits free rotation between the main body 1 and sighting bar 7.

The head portion 10 of the sighting bar 7 has imprinted thereon, or otherwise defines, an arcuate clock dial 13 concentric with the axis of relative rotation between said sighting bar and the main body and including circumferentially spaced radial lines 14 indicating hours and minutes of time and adapted to be in register with different radial lines 6 of the calendar dial 5. Inasmuch as the stars are visible to the naked eye, under most circumstances, only at night, the clock dial 13 indicates only the night hours from 6 p.m. until 6 a.m. the following morning.

The longer arm 8 of the sighting bar 7 is so disposed with respect to the circular head portion 10, that the upper longitudinal edge of the arm 8, indicated at 15, defines a true radius of the axis of rotation between the sighting bar 7 and main body 1. In other words, the plane of the longitudinal edge 15, extended, intersects the axis of rotation between the sighting bar 7 and main body 1. The edge 15 comprises a sighting edge over which the observer lines up a given fixed star. In latitudes north of the terrestial equator, one of the most convenient and mostly used of the fixed stars for such observations is Dubhe, otherwise known as Alpha Ursae Majoris, of the constellation commonly known as the Great Bear or Big Dipper. As shown in Fig. 2, the Big Dipper is imprinted on the outer end portion of the longer arm 8 and indicated generally at 16, the star Dubhe being disposed at the sighting edge 15, and indicated at 17.

The shorter arm 9 of the sighting bar 8 defines a sighting edge 18 that is parallel to but laterally offset from the plane of the longitudinal edge 15 of the longer arm 8, the plane of the edge 18 intersecting the ellipse defined by the edge 2 of the main body 1. A generally segmental sighting element 19 overlies the shorter arm 9 of the sighting bar 7 and is mounted thereon for swinging movement about an axis parallel to the axis of the pivot pin 12 by means of a shoe 20 that is received in an arcuate slot 21 in the arm 9, see particularly Figs. 2 and 4. The axis of swinging movement of the segmental sighting element is disposed at the edge 18 of said shorter arm 9. A washer equipped rivet or the like 22 extends through aligned apertures in the segmental sighting element 19 and shoe 20, and holds the segmental sighting element and shoe against accidental removal from the arm 9. The sighting element 19 has one radial edge 23 which cooperates with the adjacent portion of the elliptical edge 2 of the main body 1 to define an angular notch 24, the apex of which is utilized in the taking of a sight on a second fixed reference star more closely aligned with the celestial pole than the star sighted on the longitudinal edge 15 of the longer arm 8. In northern latitudes, this second reference star is usually the North or Pole Star, otherwise known as Polaris. When the segmental sighting element 19 is positioned as indicated by full lines in Fig. 2, the sighting edge 23 thereof is coincident with the edge 18 of the shorter arm 9. This setting of the segmental sighting element 19 is used when a reading is taken on or near the terrestrial equator. When the reading is taken at a latitude between the equator and a terrestrial pole, the segmental sighting element 19 is moved about its axis of swinging movement in a counterclockwise direction with respect to Fig. 2 to displace the apex of the notch 24 in a direction away from the extended plane of the sighting edge 15, according to the latitude at which the reading is taken, as indicated by dotted lines in Fig. 2. The segmental sighting element 19 is provided with suitable indicia (not shown) to aid the observer in setting the sighting element 19 for readings at different latitudes between the nearest terrestrial pole, in this case the North Pole, and the terrestrial equator.

In the taking of a reading of the aforementioned stars Dubhe and Polaris, Dubhe, being indicated in Fig. 1 at 17a, as situated in the constellation of the Big Dipper, indicated at 16a, and Polaris, indicated at 25 in Fig. 1, it is important that the major axis of the elliptical main body 1 be disposed vertically, without regard to the position of the sighting bar 7, when the axis of pivotal movement between the body 1 and sighting bar 7 is horizontally disposed. In order to insure this vertical positioning of the major axis of the main body 1, I provide a weight 26 adjacent one end of the main body 1 secured thereto by means of a split rivet or the like 27, see particularly Figs. 2 and 3.

To ascertain the correct time, the user stands directly facing Polaris with the instrument held substantially at arm's length with the arms 8 and 9 of the sighting bar pointing in a generally east and west direction, the axis of the pivot pin or rivet 12 being generally horizontal. In the event that the observer is at the equator, the segmental sighting element 19 will be positioned as indicated by full lines in Fig. 2. If the observer is located at a distance north of the terrestrial equator, the sighting element 19 will be moved correspondingly as indicated by dotted lines in Fig. 2. With the main body swinging freely on the pivot pin 12, the observer sights the star Polaris in the apex of the notch 24 with one eye, and rotates the sighting bar 7 to bring the star Dubhe into alignment with the sighting edge 15 of the arm 8, sighting the start Dubhe with the same eye. Then, by holding the main body 1 and sighting bar 7 against relative rotation, a reading can be made of local time directly on a given date, provided that the observer is situated on a standard time meridian. Local time then coincides with the date on the calendar dial on which the reading is taken. For instance, if the calendar and clock dials are disposed relative to each other as shown in Fig. 2, and the reading is taken during the evening of December 6, local time will be 11:55 p.m.

Inasmuch as the standard time meridians are widely spaced apart geographically, except in the extreme polar regions, most observations will be taken from points of longitude east or west of a given standard time meridian. In the United States, the standard time meridians are: Eastern Standard Time 75°; Central Standard Time 90°; Mountain Standard Time 105°; and Pacific Standard Time 120°. When the observer is at a point in a given time zone west of the standard time meridian, a correction must be added. On the other hand, if the observer is east of the standard time meridian, a given correction must be subtracted. The correction to be made for each degree of longitude east or west of a standard time meridian is one minute of time for each fifteen minutes or one-fourth degree of longitude. For instance, with a reading or observation taken on December 6 with the calendar and clock dials disposed as in Fig. 2, and the observer being located on the longitude of the city of New York, which is 73° fifty minutes, the observer will subtract five minutes from the time indicated on the clock dial. The correct standard time will not be 11:55 p.m., as shown on the clock dial, but 11:50 p.m.

As above mentioned, the upper longitudinal edge 18 and sighting edge 23 are laterally offset from the extended plane of the sighting edge 15. This laterally offset relationship compensates for the lateral displacement of the line of sight of the star Polaris from the line of sight between the eye of the observer and the true celestial North Pole.

Swinging movement of the segmental sighting element 19, to compensate for the difference in latitude between the observer and the terrestrial equator, causes the sighting edge 23 of the sighting element 19 to be angularly disposed with respect to the adjacent edge 18 of the shorter arm 9. Thus, as the major axis of the elliptical body 1 swings toward a parallel relationship with the longitudinal dimension of the sighting bar 7, the apex of the notch 24 shifts longitudinally outwardly of the shorter arm 9 and laterally toward the sighting edge 18 thereof, assuming that the sighting element 19 is in its dotted line position of Fig. 2. This movement of the angular sighting notch 24, due to the elliptical outline 2 of the main body 1, compensates for the changes in angularity between the reference stars 17a and 25 during apparent movement thereof around the diurnal circle, with the rotation of the earth about its own axis giving the illusion that the star 17a, with the other stars, moves in a circle about the star 25. Hence, when the star 17a is approximately directly above or below the star 25 at the time of reading, the angle between the lines of sight to the stars 17a and 25 is very small, and the sighting bar 7 is swung to a position relative to the main body 1 wherein the major axis of the elliptical main body 1 is substantially parallel with the sighting edges 15 and 18. At this point, the apex of the notch 24 is located substantially even with the sighting edge 18 of the shorter arm 9 so that the offset therebetween and the extended plane of the sighting edge 15 is substantially at a minimum. Obviously, during that portion of a night when the Big Dipper 16a is disposed to the left of the reference star 25 instead of to the right thereof as shown in Fig. 1, the sighting bar 7 is swung about the axis of the pivot pin 12 substantially 180°, thus disposing the edges 15, 18 and 23 at the bottom of the sighting bar 7.

The rear surfaces of the main body 1 and arm 8, not shown, provide ample space for the imprinting of directions thereon together with a listing of major cities and their longitudinal relationship with the nearest standard time meridian, together with the number of minutes of time required for correction, for easy reference. Obviously, accuracy in the determining of the correct time is determined by the distance at which the instrument is held from the observer's eye. This distance may be easily ascertained with a few trails, and after but a minimum of practice, the observer may be able to determine the correct time within five to ten minutes without difficulty.

While I have shown and described a commercial embodiment of my novel star clock, it will be understood that the same is capable of modification without departure from the spirit and scope of the invention, as defined in the claims.

What I claim is:

1. In a star clock, a main body defining an ellipse and an annular calendar dial concentric with the center of said ellipse, said calendar dial including circumferentially spaced radial lines indicating months and days of the calendar year, a sighting bar overlying said main body and comprising a relatively long arm and a relatively short arm substantially aligned with said long arm and a head portion intermediate said arms, and means pivotally mounting said sighting bar on said main body for rotation relative to said body on an axis extending through the center of said ellipse, said head portion defining an arcuate clock dial concentric with said axis and including circumferentially spaced radial lines indicating hours and minutes of time and adapted to be in register with different radial lines of said calendar dial, the longer arm of said bar defining sighting means adapted to be sighted on a given fixed star, the shorter arm of said bar having sighting means thereon laterally offset from the sighting means on said longer arm and cooperating with said ellipse to define an angular notch, the apex portion of which is adapted to be sighted on a second fixed star more closely aligned with a celestial pole than said first-mentioned star, said body having means yieldingly urging it toward a given angular relationship of the major axis of said ellipse to the longitudinal dimension of said sighting bar when the axis of relative rotation between said body and head is horizontally disposed.

2. The structure defined in claim 1 in which said ellipse is defined by the peripheral edge of said body.

3. The structure defined in claim 1 in which said sighting means of the longer arm is defined by one longitudinal edge of said longer arm, the sighting means of said shorter arm being laterally offset from the extended plane of said longitudinal edge.

4. In a star clock, a main body defining an ellipse and an annular calendar dial concentric with the center of said ellipse, said calendar dial including circumferentially spaced radial lines indicating months and days of the calendar year, a sighting bar overlying said main body and comprising a relatively long arm and a relatively short arm substantially aligned with said long arm and a head portion intermediate said arms, means pivotally mounting said sighting bar on said main body for rotation relative to said body on an axis extending through the center of said ellipse, and through said head portion, said head portion defining an arcuate clock dial concentric with said axis and including circumferentialy spaced radial lines indicating hours and minutes of time and adapted to be in register with different radial lines of said calendar dial, one longitudinal edge of said longer arm being adapted to be sighted on a given fixed star, the shorter arm of said bar having sighting means thereon laterally offset from said longitudinal edge of the longer arm and cooperating with said ellipse to define an angular notch, the apex portion of said notch being adapted to be sighted on a second fixed star more closely aligned with a celestial pole than said first mentioned star, and weight means on said body disposed radially outwardly from the center thereof for urging rotation of said body toward a given angular relationship of the major axis of said ellipse to the longitudinal dimension of said sighting bar when the axis of relative rotation between said body and head is horizontally disposed.

5. In a star clock, a main body of flat sheet stock and having an outline in the form of an ellipse, said main body defining an annular calendar dial concentric with the center of said ellipse, said calendar dial including circumferentially spaced radial lines indicating months and days of the calendar year, a sighting bar of flat sheet stock overlying said main body and comprising a relatively long arm and a relatively short arm substantially aligned with said long arm and a relatively short arm substantially aligned with said long arm and a generally circular head portion intermediate said arms, means pivotally mounting said sighting bar on said main body for rotation relative to said body on an axis extending through the centers of said ellipse and head portion, said head portion defining an arcuate clock dial at a circular edge portion thereof including circumferentially spaced radial lines indicating hours and minutes of time and adapted to be in register with different adjacent radial lines of said calendar dial, one longitudinal edge of the longer arm of said bar being adapted to be sighted on a given fixed star, the shorter arm of said bar having sighting means thereon laterally offset from the extended plane of said longitudinal edge of the longer arm and cooperating with the elliptical peripheral edge of said body to define an angular notch, the apex portion of said notch being adapted to be sighted on a second fixed star more closely aligned with a celestial pole than said first-mentioned star, and weight means on one end portion of said body for urging rotation of said body toward a given angular relationship of the major axis of said ellipse to the longitudinal dimension of said sighting bar when the axis of relative rotation between said body and the head is horizontally disposed.

6. In a star clock, a main body defining an ellipse and an annular calendar dial concentric with the center of said ellipse, said calendar dial including circumferentially spaced radial lines indicating months and days of the calendar year, a sighting bar overlying said main body and comprising a relatively long arm and a relatively short arm substantially aligned with said long arm and a head portion intermediate said arms, means pivotally mounting said sighting bar on said main body for rotation relative to said body on an axis extending through the center of said ellipse, said head portion defining an arcuate clock dial concentric with said axis and including circumferentially spaced radial lines indicating hours and minutes of time and adapted to be in register with different radial lines of said calendar dial, the longer arm of said bar defining sighting means adapted to be sighted on a given fixed star, and a sighting element mounted on the shorter arm of said bar and having a sighting portion laterally offset from the sighting means on said longer arm, said sighting portion cooperating with said ellipse to define an angular notch, the apex portion of said notch being adapted to be sighted on a second fixed star more closely aligned with a celestial pole than said first-mentioned star, said sighting element being movable on said shorter arm in directions to vary the lateral offset relationship therebetween and the sighting means on said longer arm, said body being yieldingly urged to a given angular relationship of the major axis of said ellipse to the longitudinal dimension of said sighting bar when the axis of relative rotation between said body and head is horizontally disposed.

7. In a star clock, a main body of flat sheet stock and having an outline in the form of an ellipse, said main body defining an annular calendar dial concentric with the center of said ellipse, said calendar dial including circumferentially spaced radial lines indicating months and days of the calendar year, a sighting bar of flat sheet stock overlying said main body and comprising a relatively long arm and a relatively short arm substantially aligned with said long arm and a generally circular head portion intermediate said arms, means pivotally mounting said sighting bar on said main body for rotation relative to said body on an axis extending through the centers of said ellipse and head portion, said head portion defining an arcuate clock dial at a circular edge portion thereof including circumferentially spaced radial lines indicating hours and minutes of time and adapted to be in register with different adjacent radial lines of said calendar dial, one longitudinal edge of the longer arm of said bar being adapted to be sighted on a given fixed star, a generally segmental sighting element mounted on the shorter arm of said bar for rotation on an axis parallel to the axis of relative rotation of said head and body and laterally offset from the extended plane of said longitudinal edge of the longer arm, said sighting element having a radial edge cooperating with the elliptical peripheral edge of said body to define an angular notch, the apex portion of said notch being adapted to be sighted on a second fixed star more closely aligned with a celestial pole than said first-mentioned star, and weight means on one end portion of said body for urging rotation of said body toward a given angular relationship of the major axis of said ellipse to the longitudinal dimension of said sighting bar when the axis of relative rotation between said body and head is horizontally disposed.

References Cited in the file of this patent

UNITED STATES PATENTS

| | | |
|---|---|---|
| 1,620,980 | Meacham | Mar. 15, 1927 |
| 2,441,636 | Kaufman et al. | May 18, 1948 |
| 2,527,189 | Kittelson | Oct. 24, 1950 |

FOREIGN PATENTS

| | | |
|---|---|---|
| 14,965 | Sweden | Nov. 8, 1902 |